United States Patent Office 3,424,798
Patented Jan. 28, 1969

3,424,798
$C_{25}$ and $C_{30}$ POLYENIC BETA-KETOKETALS AND PROCESS OF PREPARING THE SAME
Joseph Redel and Jean Baptiste Christian Boch, Neris-les-Bains, France, assignors to A.E.C. Societe de Chimie Organique et Biologique, Commentry, France, a corporation of France
Filed Dec. 20, 1963, Ser. No. 332,030
Claims priority, application France, Jan. 2, 1963, 920,249
U.S. Cl. 260—586                    2 Claims
Int. Cl. C07c 41/00, 49/20

ABSTRACT OF THE DISCLOSURE $C_{25}$ and $C_{30}$ beta-ketoketals having the formula

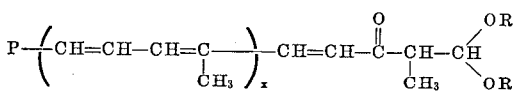

are produced from the corresponding beta-ketoenolether by dissolving the ether cold in the ROH alcohol to which is added the corresponding sodium alcoholate. P is the radical 8-(2′,6′,6′-trimethyl-cyclohex-1′-enyl)-2,6-dimethyl-octa-1,3,5,7-tetraenyl and $x$ is selected from 0 and 1. R is lower alkyl.

---

The objects of the present invention are to provide new $C_{25}$ and $C_{30}$ polyenic beta-ketoketals which serve as intermediates in the preparation of polyenic aldehydes which are homologous with the aldehyde of vitamin A or retinene, and to provide a process of preparing the same.

Figure 1:
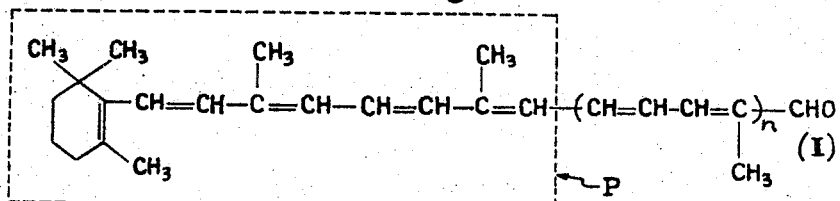

These two aldehydes, which serve as intermediate compounds in the synthetic preparation of carotenoids, are also called $C_{25}\beta$-apocarotenal and $C_{30}\beta$-apocarotenal. They are the compounds (I) of the formula shown in FIG. 1 of the accompanying drawing in which $n$ is equal to 1 in the case of $C_{25}\beta$-apocarotenal and equal to 2 in the case of $C_{30}\beta$-apocarotenal. If the radical 8-(2′,6′,6′-trimethyl cyclohex - 1′ - enyl) - 2,6 - dimethyl - octa-1,3,5,7-tetraenyl is designated by the character P surrounded by a dotted line in FIG. 1, the compounds (I) can be represented by the simplified formula:

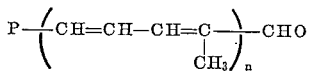

The process according to the invention comprises condensing an aldehyde (II) of formula

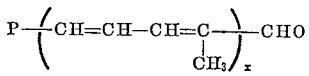

in which P has the aforementioned signification and $x$ is equal to 0 or 1, with a ketal (III) of α-methyl-β-ketobutyraldehyde having the formula

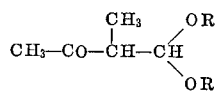

in which R is a lower alkyl radical, thereby obtaining a β-ketoketal (IV) having the formula

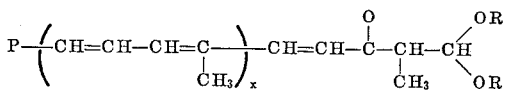

reducing said β-ketoketal (IV) into a corresponding hydroxyketal (V) and simultaneously hydrolyzing and dehydrating said hydroxyketal into the required compound (I).

It will be observed that the starting aldehyde is either the retinene ($x=0$) for the preparation of $C_{25}\beta$-apocarotental or the $C_{25}\beta$-apocarotenal itself ($x=1$) for the preparation of $C_{30}\beta$-apocarotenal. In other words, it is possible in accordance with the invention to obtain, in starting with retinene, $C_{25}\beta$-aprocarotenal or $C_{30}\beta$-apocarotenal in applying once or twice, respectively, the sequence of the reactions mentioned hereinbefore.

Figure 2:
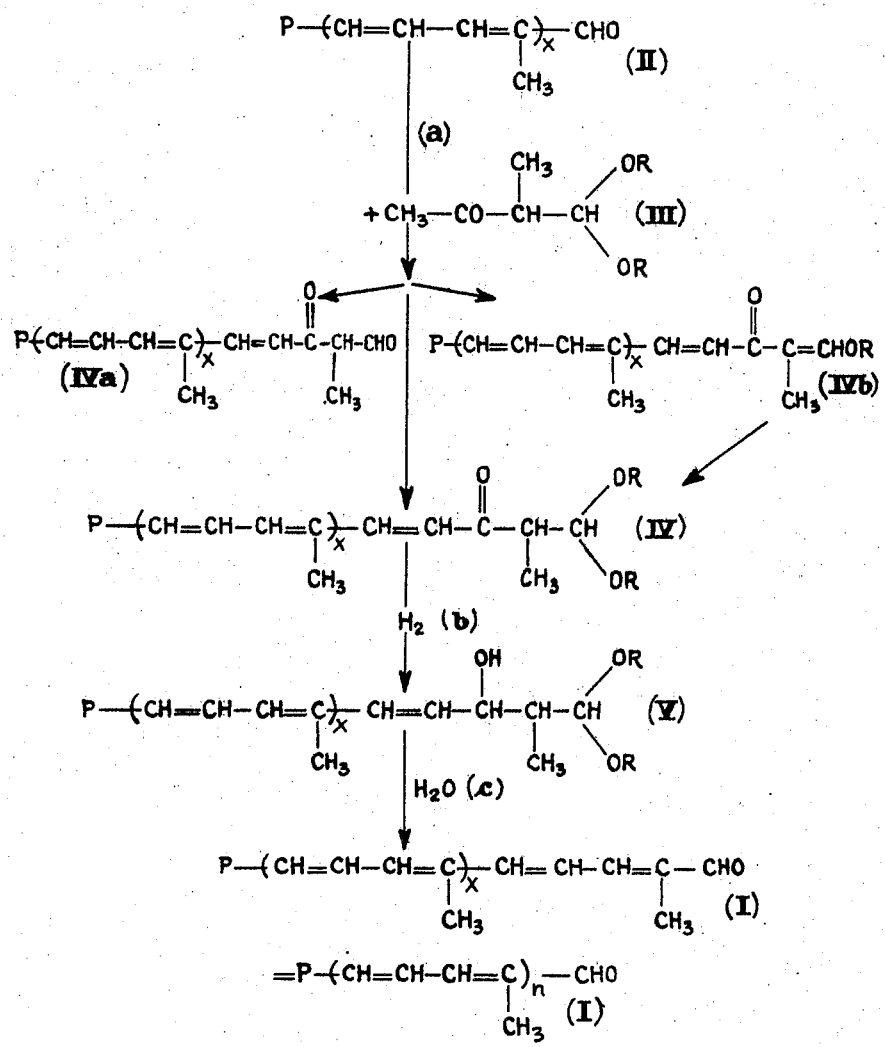

This sequence will now be examined in detail with reference to FIG. 2 which illustrates it.

In the first stage or stage (a) of the sequence, the aldehyde (II) is condensed with ketal (III) which is advantageously dimethylketal (R=CH₃). This condensation is advantageously carried out at low temperature (0–20° C.) in an anhydrous solvent in the presence of a basic catalyst formed preferably by solid sodium methylate or sodamide. The preferred solvents are light petroleum and methylene chloride. It is also possible to employ methanol containing as a catalyst sodium methylate prepared in situ from sodium but, as will be seen hereinafter, this manner of proceeding is less advantageous.

The condensation provides the β-ketoketal (IV) but the β-ketoenolether (IVb) is formed next to it and the ketoaldehyde (IVa) could also be formed. In fact, in operating in methanol in the presence of sodium methylate noticeable amounts of ketoaldehyde (IVa) are formed which cannot be employed directly for the rest of the reaction but constitutes nonetheless an interesting new compound as starting material for subsequent synthetic preparations or as a coloring agent. In the presently-described process, the other solvents mentioned hereinbefore are in general preferred. In carrying out the condensation in the latter solvents in the neighbourhood of 0° C. it is possible, in the course of the preparation of the $C_{25}$ apocarotenal ($x=0$), to completely avoid formation of ketoaldehyde (IVa). Although the same result cannot be obtained in the case of $C_{30}$ apocarotenal ($x=1$), the use of solvents other than methonal reduces the amount of ketoaldehyde (IVa) which can be separated from the reactional mixture by dissolving in an alkaline aqueous medium.

The formation of β-ketoenolether (IVb) as secondary product is not troublesome. It is indeed possible to convert the β-ketoenolether at least partially into β-ketoketal (IV) by dissolving it cold in the ROH alcohol to which is added the corresponding sodium alcoholate. Thus the content of β-ketoketal (IV) in the reactional mixture is markedly increased.

The β-ketoketals (IV) are new compounds embraced by the invention.

In the second stage (b) of the process, the β-ketoketal (IV) is reduced into hydroxyketal (V). This reduction is carried out advantageously either in ether by means of lithium aluminium hydride at −60° C. or in methanol at 40° C. by means of potassium borohydride. The hydroxyketals (V) are new compounds also embraced by the invention.

In the last stage (c) of the process the hydroxyketal (V) is simultaneously hydrolyzed and dehydrated into the desired apocarotenal (I). For this purpose, the hydroxyketal (V) is heated in a solvent such as acetone containing the amount of water necessary for the hydrolysis in the presence of an acid. Hydrochloric acid and hydrobromic acid and above all the latter give the best results.

The following examples illustrate the invention, it being understood that the scope of the latter is not intended to be limited thereto.

In the Example 1 relating to the preparation of $C_{25}$ β-apocarotenal the indices $n$ and $x$ have respectively the values 1 and 0, whereas in the Example II which relates to the preparation of $C_{30}$ β-apocarotenal $n=2$ and $x=1$. Further, in both examples R represents a methyl group.

EXAMPLE I.—13-(2'-6'-6'-trimethyl cyclohex-1' enyl)-2, 7,11-trimethyl-trideca-2,4,6,8,10,12-hexaen-1-al or $C_{25}$-β-apocarotenal (I)

(a) 13 - (2',6',6, - trimethyl-cyclohex-1-(enyl)-2,7,11-trimethyl - 1,1 - dimethoxy - 3-one-trideca-4,6,8,10,12 pentaene or $C_{25}$-β-ketoketal (IV).

(1) Condensation in the presence of sodium methylate. —94 g. of retinene (II)

($\lambda$ max.—370 m$\mu$, $E_{1\,cm.}^{1\%}=1482$ in hexane)

are dissolved at room temperature in 142 g. of α-methyl-β-ketobutyraldehyde dimethyl ketal (III) B.P. $_{16\,mm.}=66°$ C.), prepared in accordance with Royals and Brannock (J. Amer. Chem. Soc., 1953, 75, 2052) and 940 cc. of anhydrous light petroleum. The mixture is cooled to 0.° C. and 9 g. of dry sodium methylate are added.

This mixture is then left at 0° C. for 1 hour while stirring well. At the end of this period, the maximum ultraviolet absorption base shifted to 395 m$\mu$.

The product is extracted with ether, washed with water and then several times extracted with 50 cc. of 0.3% sodium hydroxide, once with 5% bicarbonate and then with water until neutral. The combined aqueous layers are back-extracted once with ether. They do not contain β-ketoaldehyde (IVa). The ethereal layer is dried on sodium sulphate and evaporated under a vacuum at 100° C.

The product is in the form of a reddish oil and reveals by chromatography in a thin layer the presence of two stereoisomers and that of $C_{25}$ enol-ether (IVb). The amount of the latter is estimated by plate chromatography at about 18%.

Weight: 136 g. $\lambda$ max.$=395$ m$\mu$—$E_{1\,cm.}^{1\%}=1295$ (hexane)

If the condensation is carried out in the same manner as the foregoing but by replacing the light petroleum by 240 cc. of methanol, there are obtained 104 g. of $C_{25}$ ketoketal (IV) (containing a small amount of $C_{25}$ enol-ether (IVb) and 26 g. of β-ketoaldehyde (IVa); the latter is isolated after acidification of the basic washing layers by extraction with ether.

This β-ketoaldehyde has the following characteristics:

Red crystals—M.P.$=114.5$–$115°$ C. $\lambda$ max.$=415$ m$\mu$—$E_{1\,cm.}^{1\%}=1432$ (isopropanol) $\lambda$ max.$=435$ m$\mu$—$E_{1\,cm.}^{1\%}=1950$ (hexane)

Analysis.—Calculated for $C_{25}H_{34}O_2=366.55$: C, 81.91%; H, 9.34%. Found: C, 81.80%; 81.62%; H, 9.28%, 9.30%.

(2) Increasing the ketal content.—138 g. of $C_{25}$ β-ketoketal ($E_{395}=1295$) are dissolved in 414 cc. of anhydrous light petroleum and 690 cc. of anhydrous methanol. 6.5 g. of sodium methylate are added to 0° C. and the mixture is well stirred for 1 hour at 0° C.

The mixture is poured into iced water, extracted with ether, washed with water until neutral and the aqueous layers are back-extracted once. The ethereal layer is dried on sodium sulphate and evaporated under a vacuum.

$\lambda$ max.$=395$ m$\mu$—$E_{1\,cm.}^{1\%}=1308$ (hexane)

A plate chromatograph confirms the reduction of the enol-ether content down to about 11%.

(3) Condensation in the presence of sodamide.—1 g. of retinene (II)

($E_{1\,cm.}^{1\%}=1482$ in hexane)

is dissolved at room temperature in 1.5 g. of α-methyl-β-ketobutyraldehyde dimethyl ketal (III) and 3 cc. of anhydrous light petroleum. The mixture is cooled at 0° C. and 0.137 g. of sodamide is added.

The mixture is then maintained 1 hour at 15° C. while stirring well. At the end of this time, the absorption maximum has shifted to 395 m$\mu$.

The mixture is extracted with ether, washed with water and then several times with 0.3% sodium hydroxide, once with 5% bicarbonate and then with water until neutral. The combined aqueous layers are counter extracted once with ether. They do not contain $C_{25}$ β-ketoaldehyde (IVa). The ethereal layer is dried on sodium sulphate and evaporated under a vacuum at 100° C.

Weight: 1.50 g. $\lambda$ max.$=395$ m$\mu$—$E_{1\,cm.}^{1\%}=1082$ (hexane)

(b) 13 - (2',6',6' - trimethyl-cyclohex-1'-enyl)-2,7,11-trimethyl - 3-hydroxy-1,1-dimethoxy-trideca - 4,6,8,10,12-pentaene or $C_{25}$ β-hydroxy-ketal (V).

(1) Reduction with potassium borohydride.—There is slowly added to a solution of 126 g. of $C_{25}$ β-ketoketal (IV)

($E_{1\,cm.}^{1\%}=1308$)

in 378 cc. of ether and 1260 cc. of methanol at room temperature a solution of 21 g. of potassium borohydride in 80 cc. of water.

The mixture is stirred for 30–45 minutes at 40° C. At the end of this time, the absorption maximum has shifted from 395 to 360 m$\mu$. The mixture is cooled, decomposed with a saturated solution of sodium chloride, thrown into water, extracted with ether, and washed with water. It is dried on sodium sulphate and concentrated under a vacuum.

The product is in the form of a yellow oil constituted by a mixture of stereoisomers.

$\lambda$ max.$=360$ m$\mu$—$E_{1\,cm.}^{1\%}=1480$ (hexane)

(2) Reduction with aluminium lithium hydride.—A solution of 1 g. of $C_{25}$ ketoketal (IV)

($E_{1\,cm.}^{1\%}$ 1250 in hexane)

in 25 cc. of anhydrous diethyl ether is slowly added at $-60°$ C. to a suspension of 0.072 g. of 90% aluminium lithium hydride in 9.2 cc. of diethyl ether.

The mixture is stirred for 60 minutes at $-60°$ C. At the end of this time the absorption maximum has shifted to 360 m$\mu$. The excess hydride is destroyed with methyl formiate, the complex is decomposed with a solution of saturated ammonium chloride, filtered, washed with water until neutral, dried on sodium sulphate and evaporated under a vacum.

Weight: 0.95 g. $\lambda$ max.$=360$ m$\mu$—$E_{1\,cm.}^{1\%}=1250$ (hexane)

(c) 13 - (2',6',6'-trimethyl-cyclohex-1'-enyl)-2,7,11-trimethyl-trideca-2,4,6,8,10,12-hexaen-1-al or $C_{25}$ β-apocarotenal (I).

(1) In the presence of hydrobromic acid.—122 g. of $C_{25}$ β-hydroxyketal (V)

($E_{1\,cm.}^{1\%}=1480$)

are put into solution in 2440 cc. of acetone to which 24 cc. of water are added. The mixture is refluxed and 0.73 cc. of 48% hydrobromic acid is added.

After 20 minutes, the absorption maximum has shifted to 410 m$\mu$. The mixture is cooled, thrown into water, extracted with ether, washed with 5% sodium bicarbonate and then with water until neutral. The mixture is dried on sodium sulphate and concentrated under vacuum.

There is obtained a viscous reddish oil ($\lambda$ max.$=414$ m$\mu$—$E_{1\,cm.}^{1\%}=1612$)

constituted by a mixture of 3 geometric isomers from which only a small part of the all-trans aldehyde becomes crystallized in ether into red crystals, M.P.$=105°$ C.

$\lambda$ max.$=414$ m$\mu$—$E_{1\,cm.}^{1\%}=2250$ (hexane)

Isler (Helv. Chim. Acta, 1959, 42, 861) indicates $\lambda$ max.$=414$ m$\mu$—$E_{1\,cm.}^{1\%}=2160$ (light petroleum)

*Analysis.*—Calculated for $C_{25}H_{34}O$—P.M.=350.52: C, 85.66%; H, 9.78%. Found: C, 85.15%, 85.27%; H, 9.85%, 9.86%.

(2) In the presence of hydrochloric acid.—0.5 g. of $C_{25}$ β-hydroxyketal (V)

($\lambda$ max.=360 m$\mu$—$E_{1\,cm.}^{1\%}$=1092 in isopropanol)

is put in solution in 10 cc. of acetone. 0.12 cc. of N hydrochloric acid is added and the mixture refluxed for 1 hour. At the end of this time, the absorption maxima has shifted to 414 m$\mu$. The mixture is cooled, thrown into water, extracted with ether, washed with 5% bicarbonate, and with water until neutral and dried and concentrated under a vacuum.

Weight: 0.43 g. $\lambda$ max. 415 m$\mu$—$E_{1\,cm.}^{1\%}$=845 (isopropanol)

EXAMPLE II.—17-(2′,6′,6′-trimethyl-cyclohex-1′-enyl)-2,6,11,15 - tetramethyl heptadeca - 2,4,6,8,10,12,14,16-octaen-1-al or $C_{30}$ β-apocarotenal (I).

(a) 17 - (2′,6′,6′ - trimethyl - cyclohex-1′-enyl)-2,6,11, 15 - tetramethyl - 1,1 - dimethoxy-3-one-heptadeca-4,6,8, 10,12,14,16—heptaen or $C_{30}$ β-ketoketal (IV).

88.5 g. of $C_{25}$ apocarotenal (II)

($E_{1\,cm.}^{1\%}$=1612)

are dissolved in 885 cc. of anhydrous methylene chloride and 132.75 g. of α-methyl-β-ketobutyraldehyde dimethyl ketal (III). 8.85 g. of dry sodium methylate are added and the mixture vigorously stirred at 18° C. At the end of about 2 hours 30 minutes, the absorption maximum has shifted to 430 m$\mu$.

The product is extracted with ether, washed several times with 0.3% sodium hydroxide, and then with water until neutral. The product is dried on sodium sulphate and concentrated under a vacuum.

The product is in the form of a viscous oil ($\lambda$ max.=430 m$\mu$—$E_{1\,cm.}^{1\%}$=1345 in hexane)

and reveals by plate chromatography the presence of two geometric isomers and the presence of $C_{30}$ enol-ether (IVb). The amount of the latter is estimated at about 21%. A small part of the all-trans ketal becomes crystallized in the methanol into red crystals. M.P.=119° C.

$\lambda$ max.=435 m$\mu$—$E_{1\,cm.}^{1\%}$=1892 (hexane)

$\lambda$max.=450 m$\mu$—$E_{1\,cm.}^{1\%}$=1705 (isopropanol)

Titration of the methoxy group (Zeisel) percent calculated 12.95, found 12.35.

*Analysis.*—Calculated for $C_{32}H_{46}O_3$—M.W.=478.68: C, 80.29%; H, 9.68%. Found: C, 80.16%, 80.16%; H, 9.57%, 9.61%.

The sodium aqueous layer after acidification and extraction with ether yields 3.25 g. of $C_{30}$ ketoaldehyde (IVa) which can be crystallized in ether into deep red crystals. M.P.=169.5–170° C.

$\lambda$ max.=450 m$\mu$—$E_{1\,cm.}^{1\%}$=1910 (isopropanol)

$\lambda$ max.=470 m$\mu$—$E_{1\,cm.}^{1\%}$=2230 (hexane)

*Analysis.*—Calculated for $C_{30}H_{40}O_2$—M.W.=432.62: C, 83.28%, H, 9.31%. Found: C, 83.13%, 83.18%; H, 8.92%, 8.89%.

Increasing the ketal content.—105 g. of $C_{30}$ ketoketal (IV)

($E_{1\,cm.}^{1\%}$=1345)

are put into solution in 315 cc. of anhydrous light petroleum and 525 cc. of anhydrous methanol. The mixture is cooled to 0° C., 3 g. of dry sodium methylate are added and stirring continued for 1 hour at 0° C.

The product is extracted with ether, washed with water until neutral, dried on sodium sulphate and evaporated under a vacuum.

$\lambda$ max.=435 m$\mu$—$E_{1\,cm.}^{1\%}$=1355

A plate chromatograph shows a very distinct drop in the percentage of enol ether to about 9%.

(b) 17-(2′,6′,6′-trimethyl cyclohex-1′-enyl)-2,6,11,15-tetra ethyl-3-hydroxy-1,1-dimethoxy heptadeca-4,6,8,10, 12,14,16-heptaene or $C_{30}$β-hydroxy-ketal (V).

105 g. of $C_{30}$β-ketoketal (IV)

($E_{1\,cm.}^{1\%}$=1355)

are put into solution in 420 cc. of ether and 1050 cc. of methanol. A solution of 15 g. of potassium borohydride in 60 cc. of water are added and the mixture vigorously stirred at 40° C.

At the end of about 1 hour, the absorption maximum has shifted to 400 m$\mu$.

The product is cooled, decomposed with a saturated solution of sodium chloride, thrown into water and extracted with ether. The ethereal solution is dried and concentrated under a vacuum.

The product is in the form of a reddish oil constituted by a mixture of geometric isomers.

max.=400 m$\mu$—$E_{1\,cm.}^{1\%}$=1545 (hexane)

(c) 17-(2′,6′,6′-trimethyl cyclohex-1′ enyl)-2,6,11,15-tetramethyl heptadecae 2,4,6,8,10,12,14,16-octaen-1- al or $C_{30}$-apocarotenal (I).

102 g. of $C_{30}$ β-hydroxyketal (V)

($E_{1\,cm.}^{1\%}$=1545 are put into solution in 2040 cc. of acetone containing 20 cc. of water. 0.61 cc. of 48% hydrobromic acid is added.

The mixture is refluxed for 30 minutes and at the end of this time the absorption maximum has shifted to about 455 m$\mu$.

The mixture is thrown into iced water containing bicarbonate, extracted with ether, washed with water until neutral, dried on sodium sulphate, and concentrated under a vacuum.

A viscous red oil is obtained constituted by a mixture of three geometric isomers. By crystallization in methylene-methanol chloride only a small part of the all-trans $C_{30}$ apocarotenal is obtained in the form of black flakes having a metallic sheen, M.P.=137–138° C.

$\lambda$ max.=465 m$\mu$—$E_{1\,cm.}^{1\%}$=2420 (isopropanol)

$\lambda$ max.=457 m$\mu$—$E_{1\,cm.}^{1\%}$=2640 (hexane) value identical to that given by Isler (loc. cit.)

Although specific examples of the invention have been described, it must be understood that the scope of the invention is not intended to be limited thereto.

Having described our invention, what we claim as new and desire to secure by Letters Patent is:

1. The β-ketoketals (IV) having the formula

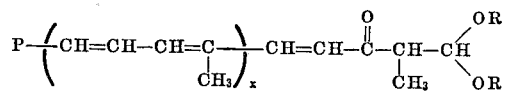

in which R corresponds to the R of the alcohol, to form enyl)-2,6-dimethyl octa-1,3,5,7-tetraenyl, $x$ is selected from 0 and 1, and R is a lower alkyl radical.

2. A process for preparing $C_{25}$ and $C_{30}$ polyenic beta-ketoketals which comprises dissolving a beta-ketoenol-ether having the formula:

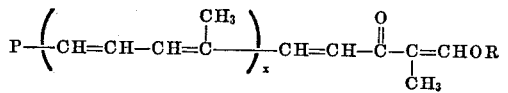

in which P is the radical 8-(2′,6′,6′-trimethylcyclohex 1′-enyl) - 2,6,-dimethyl-octa-1,3,5,7 - tetraenyl, $x$ is selected from 0 and 1 and R is lower alkyl, cold in an alcohol of the formula: ROH in which R is as described supra, to which is added a sodium alcoholate of the formula: RONa in which A corresponds to the R of the alcohol, to form the corresponding beta-ketoketal having the formula:
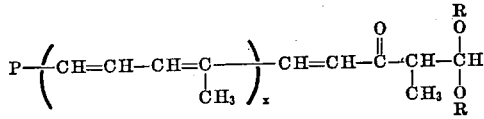
References Cited
UNITED STATES PATENTS
| | | |
|---|---|---|
| 3,097,244 | 7/1963 | Klein et al. _____ 260—598 |
| 2,987,550 | 6/1961 | Stieg et al. _____ 260—598 |
| 3,145,233 | 8/1964 | Nicolaux et al. _____ 260—586 |
| 2,676,988 | 4/1954 | Robison et al. _____ 260—586 |
| 2,941,009 | 6/1960 | Weisler et al. _____ 260—611 |
| 2,842,600 | 7/1958 | Oroshni et al. _____ 260—611 |
| 2,576,311 | 11/1951 | Schlesinger et al. __ 260—617 XR |
| 2,683,721 | 7/1954 | Schlesinger et al. __ 260—617 XR |
| 2,824,138 | 2/1958 | Wystrach et al. |
| 2,979,529 | 4/1961 | Hart. |
BERNARD HELFIN, *Primary Examiner.*
U.S. Cl. X.R.
260—598, 611